Patented Nov. 3, 1953

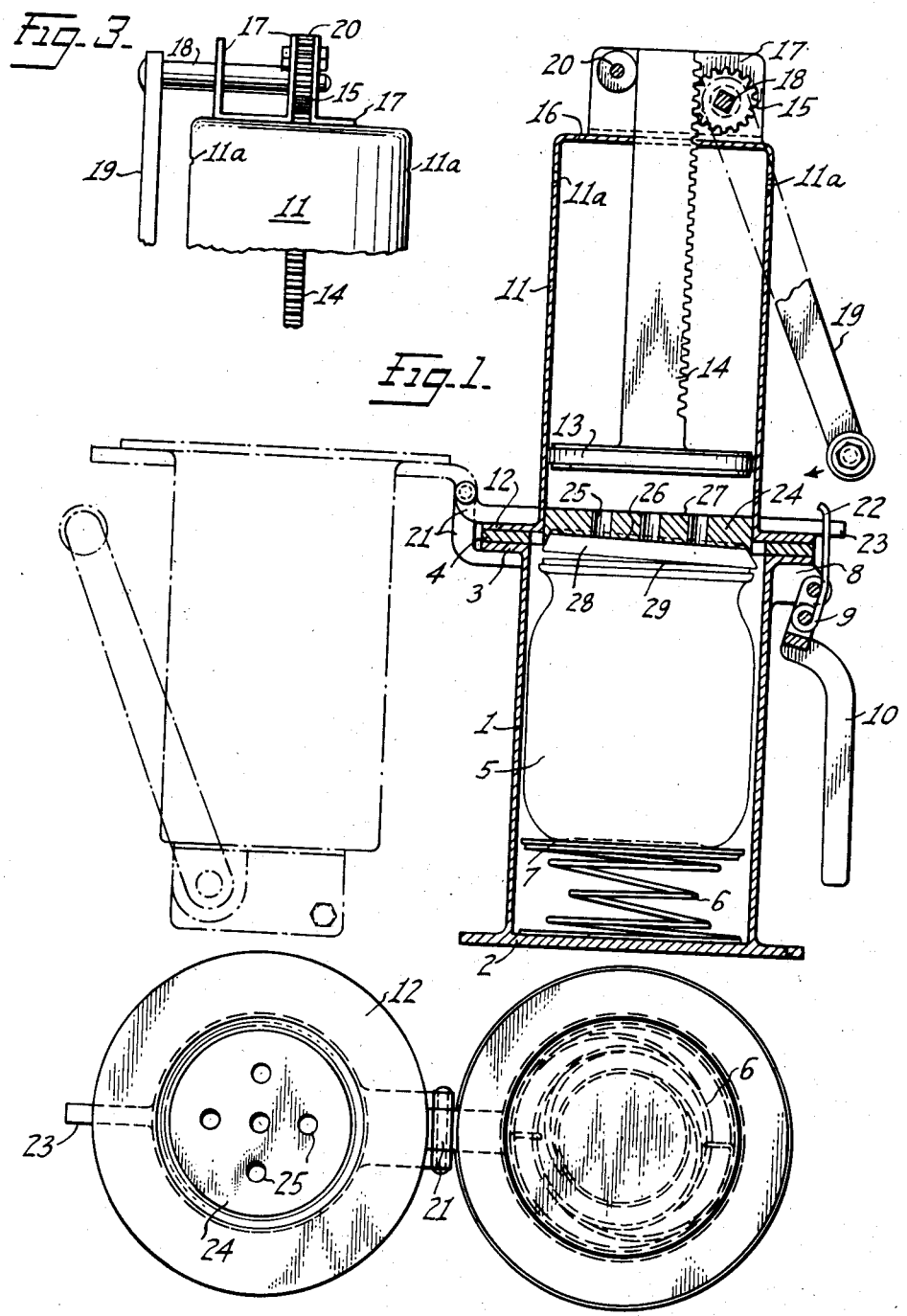

2,657,847

UNITED STATES PATENT OFFICE 2,657,847

JAR SEALING

Albert Heitmann, Hamburg-Niendorf, Germany, assignor to Will Hennings, Freeport, N. Y.

Application February 23, 1951, Serial No. 212,329

5 Claims. (Cl. 226—82)

This invention relates to improvements in jar sealing. It relates particularly to an apparatus for vacuum sealing jars.

Jars, and particularly, preserving jars may be closed by means of a vacuum. This is done by evacuating the air from a preserving jar, placing a cover and sealing ring on the preserving jar and allowing the atmospheric pressure to hold the preserving jar permanently closed. The known apparatus for effecting this type of closure consists of a vacuum receptacle into which the preserving jar to be sealed is placed. A seal, generally a rubber ring, is placed over the lip of the preserving jar, and the preserving jar cover is placed on top of this rubber ring. The air is then evacuated from the vacuum receptacle with a pump. The air is then allowed to re-enter the evacuated vacuum receptacle and the atmospheric pressure on the preserving jar cover causes a permanent closure of the preserving jar.

It has been found, however, that this conventional apparatus is not efficient in the vacuum closure of preserving jars and the covers of a considerable number of preserving jars so closed become loose after a short period of time causing the air to enter and spoiling the contents. This inadequate closure results from having the cover lie entirely on the preserving jar during the evacuation of air. Because of this an effective vacuum sufficient for permanent closure of the preserving jars is not always produced in the preserving jar.

Attempts have been made to overcome this by keeping the cover lifted off the preserving jar during the evacuation of the air from the vacuum receptacle and to place it back on the preserving jar after the air evacuation has been completed. This must, of course, be done from the outside while the vacuum receptacle is closed. The known devices for accomplishing this are very complicated as the actuating members for lowering the cover must operate through a hermetically sealed passage. Furthermore, these actuating members for lowering the cover are extremely difficult and cumbersome to manipulate and their use entails a considerable loss of time, inasmuch as the cover for the preserving jar to be closed must be arranged in the lowering device for each individual preserving jar. In addition, the position of the lowering device must be adjusted with respect to the preserving jar which is to be closed.

One object of this invention is a device for the dependable vacuum closure of preserving jars which will eliminate all the aforementioned disadvantages. This and further objects will become apparent from the description read in conjunction with the drawings:

Fig. 1 shows a longitudinal section of a vacuum closure device in accordance with the invention.

Fig. 2 is a top elevation of the device shown in Fig. 1; and

Fig. 3 is a detailed view of the upper pump part of the device shown in Fig. 1 with the piston driving mechanism shown in side view.

According to the invention a device for the closing of preserving jars under vacuum is constructed having a preserving jar holding receptacle adapted to have the air evacuated from it by means of a pump. The receptacle for the preserving jar has a closure portion which may be positioned for hermetically sealing the receptacle when the air is to be evacuated from it. This closure portion is positioned for lifting the preserving jar cover when the said closure portion is in its sealed position, and automatically positions the cover back on the preserving jar when the closure portion is opened. The closure portion may include the pump for evacuating the air from the preserving jar receptacle.

Referring to the drawing which shows one embodiment of the device according to the invention a cylindrical preserving jar receptacle 1 is constructed for receiving a preserving jar 5 to be closed. The cylindrical receptacle 1 has a base stand 2 at the bottom and a flange 3 at the top. The flange 3 is constructed for holding a sealing ring 4. The receptacle for the preserving jaws will be referred to hereafter as the vacuum receptacle. The vacuum receptacle is provided with a compression spring 6 at the bottom of the receptacle on which a supporting plate 7 rests. The compression spring and the supporting plate allow the use of jars which are customarily used for the preserving of foodstuffs in commercial quantities. Below the flange 3 a lug 8 is attached to the vacuum receptacle wall. A clamp 9 having the actuating handle 10 is pivotally attached to the lug 8. The clamp 9 has one clamp engagement member 22 attached to it.

The vacuum receptacle closure portion consists of a cylinder 11 having a sealing flange 12. The cylinder 11 is pivotally positioned in respect to the vacuum receptacle by means of the hinge 21. When the cylinder 11 is positioned in its sealing position, the flange 12 will come into sealing contact with the sealing ring 4. The cylinder 11 contains a piston 13 which makes air-tight contact with the inner walls of the cylinder 11. The piston 13 is attached to the piston rod 14 which has one surface in the form of a rack. The rack on the piston rod 14 is engaged by the gear 15, which is rotatably supported on a shaft 18 between two bearing blocks 17 fastened to the cylinder top 16. A crank 19 is fastened to the shaft 18. The shaft 18 is rigidly attached to the gear 15, so that a rotation of the handle 19 will cause the gear 15 to rotate and cause the piston rod 14 to move up or down, depending upon the direction of rotation. The surface of the piston rod 14 opposite to the surface defining the rack rests against the idling wheel 20, which is also rotatably supported between the bearing blocks 17. The pump cylinder 11 may be swung on the hinge 21 into the position shown in the dotted lines in Fig. 1 and in full lines in Fig. 2. This is the opened position which the apparatus is placed in when the preserving jar to be closed is placed in the vacuum receptacle 1 on the supporting plate 7.

The cylinder 11 may have the two holes 11a placed precisely opposite each other, so that the piston 13 in its upper position will pass over these holes and allow the air from the outside to force its way into the receptacle into the cylinder 11 and exert pressure on the cover 28 of the preserving jar 5.

The cylinder 11 has a clamp engaging portion 23 positioned above its flange 12 for engagement with the lower clamp portion 22. When the cylinder is placed in its sealing position on the vacuum receptacle 1, the handle 10 is lifted, the two clamp engaging portions 22 and 23 are contacted with each other, the handle 10 is depressed, which forces the flanges 12 and 3 against the sealing ring 4 and holds them in that position making an air-tight connection between the cylinder and the vacuum receptacle.

At the bottom position of the cylinder 11 a plate 24 is positioned. This plate is provided with the perforations 25 and will hereafter be called the perforated plate. The vacuum receptacle 1 and the cylinder 11 are thus communicated with each other through the perforations 25 when the cylinder is positioned for air-tight engagement with the vacuum receptacle. The perforated plate 24 is so constructed that it exerts pressure on one side of the preserving jar cover 28. This pressure is exerted on the side nearest to the clamp and furthest from the hinge. Due to this pressure on one side of the cover, the cover is pressed down on this side and lifted at the opposite side. With the cover so lifted any pressure in the vacuum receptacle will equalize itself with the pressure in the preserving jar and the pressures in the vacuum receptacle and the preserving jar will be equal. Thus, if the air is evacuated from the vacuum receptacle, it will also be evacuated from the preserving jar.

The pressure on one side of the preserving jar cover is caused by constructing the perforated plate, so that its upper surface 27 and its lower surface 26 are not parallel to each other, and the maximum cross section of the perforated plate lies at the point nearest the clamp and the smallest cross section lies at the point nearest the hinge. The upper surface 27 lies parallel to the base plate 2 and the lower surface 26 lies at an angle with the base plate 2, so that the distance between the base plate 2 and the lower surface 26 increases from the side of the clamp to the hinge side.

The action of the perforated plate in exerting a pressure on the side of the preserving jar cover nearest the clamp is aided by the compression spring 6 which forces the preserving jar arranged on the supporting plate 7 against the perforated plate.

The apparatus operates as follows: The cylinder is pivoted in its opened position as shown by the dotted lines in Fig. 1, the preserving jar which is to be closed is placed with its sealing ring and cover on it on the supporting plate 7. The preserving jar 5 may compress the spring 6 somewhat depending upon its weight. The cylinder is then swung into its closed position as shown by the solid lines in Fig. 1 and locked in this position by means of the clamp to form an air-tight closure with the vacuum receptacle. When the cylinder 11 is in this closed position and as long as it remains in this position, the perforated plate 24 presses on one side of the preserving jar cover 28, so that the latter is lifted from the preserving jar at the side opposite the pressure. The vacuum receptacle 1 and the interior of the preserving jar 5 are thus continuously communicated with each other and their pressures will be equal.

By turning the crank 19 in the direction of the arrow in Fig. 1, the piston 13 is caused to rise and the vacuum necessary for the permanent closure of the preserving jar is produced in the entire system. Since the cover 28 is lifted, the vacuum effected in the vacuum receptacle 1 will also be effected within the preserving jar, and thus there is full assurance that the required amount of air has been evacuated from the preserving jar.

If the clamp is now opened the pressure on one side of the cover is eliminated and the cover will lie accurately upon the sealing ring of the preserving jar. The atmospheric pressure entering the system when the clamp is further opened will press the cover firmly and permanently on to the preserving jar.

The apparatus according to the invention not only provides a vacuum closure of preserving jars which can be handled rapidly, easily and conveniently, and assures a permanent and dependable closure of the preserving jars, but also makes it possible to effect the permanent vacuum closure when using both hot and cold materials to be sealed in the preserving jars.

It can be seen from the description that the invention is an apparatus for vacuum sealing preserving jars, having a vacuum receptacle and an airtight closure for the vacuum receptacle. The closure has means which exert an uneven pressure upon the cover of the preserving jar when the closure is in its sealed position, and thus lift one side of the preserving jar cover and keep that side lifted during the time when the closure is in its sealed position. The means which exert the pressure on one side of the preserving jar cover are released when the closure is removed from its sealed position, and thus the preserving jar cover will fall into its exact position and be held in that position permanently by the atmospheric pressure. The closure means may be any closure means for effecting a hermetic seal with the vacuum receptacle and from which air may be evacuated. It is preferable that the closure means include the air pump in the form of a piston and piston rod. The pressure means for the preserving jar cover may be any means actuated by the closure which will exert an uneven pressure upon the preserving jar cover when the closure is in its sealed position and release this uneven pressure when the closure is being removed from the sealed position.

I claim:

1. Device for vacuum-sealing preserving jars comprising means defining a vacuum receptacle for holding a jar to be sealed with its sealing ring and cover, means defining a closure for said vacuum receptacle, said closure being removably positioned for hermetically sealing said vacuum receptacle and having pressure means positioned at an inner edge of said closure for exerting a pressure upon one edge of a jar cover positioned in said vacuum receptacle to tilt the opposite edge upwardly, when said closure means is in sealing position, means for evacuating air from said receptacle when said closure means is in hermetically sealing position.

2. Device according to claim 1 in which said closure means is cylinder means pivotally positioned for sealing engagement with said vacuum receptacle, said cylinder means containing means defining a piston movably positioned in said cylinder for forming a vacuum in said cylinder and said vacuum receptacle.

3. Device according to claim 2 in which said pressure means for exerting a pressure on one side of a jar cover is a perforated plate positioned in said cylinder for contact with the side of a jar cover opposite said pivot, when said cylinder is in sealing engagement with said vacuum receptacle.

4. Device according to claim 3 in which said vacuum receptacle contains spring means positioned for pressing a jar against said perforated plate when said cylinder is in sealing engagement with said vacuum receptacle.

5. Device according to claim 4 in which said vacuum receptacle has means defining a flange with an elastic seal positioned thereon and said cylinder has means defining a flange positioned for sealing contact with said elastic seal when said cylinder is in sealing engagement with said vacuum receptacle.

ALBERT HEITMANN.

References Cited in the file of this patent

UNITED STATES PATENTS

| Number | Name | Date |
|---|---|---|
| 230,179 | Dolby | July 20, 1880 |
| 1,353,398 | Ingram | Sept. 20, 1920 |
| 1,844,826 | Staunton | Feb. 9, 1932 |